US011716141B1

(12) United States Patent
Palese

(10) Patent No.: US 11,716,141 B1
(45) Date of Patent: Aug. 1, 2023

(54) PHOTONIC INTEGRATED CIRCUIT-BASED OPTICAL COMMUNICATION OPTIMIZED FOR RECEIVE APERTURE AMPLITUDE AND PHASE MODULATIONS

(71) Applicant: Raytheon Company, Waltham, MA (US)

(72) Inventor: Stephen P. Palese, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/734,887

(22) Filed: May 2, 2022

(51) Int. Cl.
H04B 10/11 (2013.01)
H04B 10/67 (2013.01)

(52) U.S. Cl.
CPC ........... H04B 10/11 (2013.01); H04B 10/673 (2013.01)

(58) Field of Classification Search
None
See application file for complete search history.

(56) References Cited

U.S. PATENT DOCUMENTS

| 9,740,079 | B1 * | 8/2017 | Davids | G02B 6/1347 |
| 2016/0033766 | A1 * | 2/2016 | Hajimiri | G02B 5/1842 |
| | | | | 348/322 |
| 2017/0324162 | A1 * | 11/2017 | Khachaturian | H01Q 21/0087 |
| 2018/0107091 | A1 | 4/2018 | Hosseini et al. | |
| 2018/0123699 | A1 * | 5/2018 | Fatemi | H04B 10/613 |
| 2019/0089460 | A1 * | 3/2019 | Khachaturian | H04B 10/50 |
| 2019/0260123 | A1 * | 8/2019 | Poulton | H01Q 3/2676 |
| 2020/0284910 | A1 | 9/2020 | Yaacobi et al. | |

FOREIGN PATENT DOCUMENTS

CN 113162696 A 7/2021

OTHER PUBLICATIONS

Kendrick et al., "System and Method for Calibrating PIC-Based Optical Phased Array Transmitter and Receiver," U.S. Appl. No. 17/150,797, filed Jan. 15, 2021, 34 pages.
Palese et al., "Photonic Integrated Circuit-Based Coherently Phased Array Laser Transmitter," U.S. Appl. No. 17/162,860, filed Jan. 29, 2021, 34 pages.

(Continued)

Primary Examiner — David W Lambert

(57) ABSTRACT

An apparatus includes a photonic integrated circuit having an optical phased array, where the optical phased array includes multiple unit cells. Each unit cell includes (i) an antenna element configured to receive optical signals and (ii) a modulator configured to phase-shift the optical signals received by the antenna element. Multiple subgroups of the unit cells in the optical phased array are configured to generate multiple combined optical signals based on the received optical signals. The apparatus also includes at least one of: (i) amplitude adjusters configured to modify amplitudes of the combined optical signals in order to compensate for amplitude modulations across a receive aperture of the optical phased array and (ii) phase modulators configured to modify phases of the combined optical signals in order to compensate for phase modulations across the receive aperture of the optical phased array.

20 Claims, 10 Drawing Sheets

(56) References Cited

OTHER PUBLICATIONS

Palese et al., "Photonic Integrated Circuit-Based Communication Transmit/Receive System," U.S. Appl. No. 17/174,132, filed Feb. 11, 2021, 61 pages.
Yengst et al., "Digital Input Circuit Design for Photonic Integrated Circuit," U.S. Appl. No. 17/174,173, filed Feb. 11, 2021, 59 pages.
Kendrick et al., "Photonic Integrated Circuit-Based Optical Phased Array Phasing Technique," U.S. Appl. No. 17/174,180, filed Feb. 11, 2021, 60 pages.
Inamdar et al., "Photonic Integrated Circuit-Based Optical Phased Array Calibration Technique," U.S. Appl. No. 17/174,197, filed Feb. 11, 2021, 61 pages.
Shamee, "Photonic Integrated Circuit-Based Optical Phased Array Communication System," U.S. Appl. No. 17/643,114, filed Dec. 7, 2021, 28 pages.
Palese et al., "Photonic Integrated Circuit with Independent Unit Cells Having Multi-Polarization Sensitivity," U.S. Appl. No. 17/654,200, filed Mar. 9, 2022, 44 pages.
Kendrick et al., "Photonic Integrated Circuit-Based Imaging Systems," U.S. Appl. No. 17/654,204, filed Mar. 9, 2022, 35 pages.
Palese et al., "Photonic Integrated Circuit-Based Polarization-Independent Optical Devices," U.S. Appl. No. 17/659,789, filed Apr. 19, 2022, 44 pages.
International Search Report and Written Opinion of the International Searching Authority dated May 11, 2023, in connection with International Application No. PCT/US2023/01 1254, 10 pages.

* cited by examiner

PHOTONIC INTEGRATED CIRCUIT-BASED OPTICAL COMMUNICATION OPTIMIZED FOR RECEIVE APERTURE AMPLITUDE AND PHASE MODULATIONS

TECHNICAL FIELD

This disclosure relates generally to optical systems. More specifically, this disclosure relates to photonic integrated circuit-based optical communication optimized for receive aperture amplitude and phase modulations.

BACKGROUND

Next-generation optical phased arrays (OPAs) are being designed for use in free-space optical systems, which refer to systems where optical signals are transmitted and received through free space rather than through optical fibers. These optical phased arrays are often implemented using photonic integrated circuits (PICs). A photonic integrated circuit refers to a device that integrates multiple photonic or light-based functions into the device. A photonic integrated circuit may include an array of nano-antennas, which represent extremely small antennas that can be used for transmitting or receiving optical signals.

SUMMARY

This disclosure relates to photonic integrated circuit-based optical communication optimized for receive aperture amplitude and phase modulations.

In a first embodiment, an apparatus includes a photonic integrated circuit having an optical phased array, where the optical phased array includes multiple unit cells. Each unit cell includes (i) an antenna element configured to receive optical signals and (ii) a modulator configured to phase-shift the optical signals received by the antenna element. Multiple subgroups of the unit cells in the optical phased array are configured to generate multiple combined optical signals based on the received optical signals. The apparatus also includes at least one of: (i) amplitude adjusters configured to modify amplitudes of the combined optical signals in order to compensate for amplitude modulations across a receive aperture of the optical phased array and (ii) phase modulators configured to modify phases of the combined optical signals in order to compensate for phase modulations across the receive aperture of the optical phased array.

In a second embodiment, a method includes receiving optical signals at a photonic integrated circuit having an optical phased array, where the optical phased array includes multiple unit cells. Each unit cell includes (i) an antenna element configured to receive the optical signals and (ii) a modulator configured to phase-shift the optical signals received by the antenna element. Multiple subgroups of the unit cells in the optical phased array generate multiple combined optical signals based on the received optical signals. The method also includes at least one of: (i) modifying amplitudes of the combined optical signals using amplitude adjusters in order to compensate for amplitude modulations across a receive aperture of the optical phased array and (ii) modifying phases of the combined optical signals using phase modulators in order to compensate for phase modulations across the receive aperture of the optical phased array.

In a third embodiment, an apparatus includes a photonic integrated circuit having an optical phased array, where the optical phased array includes multiple unit cells. Each unit cell includes (i) means for receiving optical signals and (ii) means for shifting a phase of the optical signals. Multiple subgroups of the unit cells in the optical phased array are configured to generate multiple combined optical signals based on the received optical signals. The apparatus also includes at least one of: (i) means for modifying amplitudes of the combined optical signals in order to compensate for amplitude modulations across a receive aperture of the optical phased array and (ii) means for modifying phases of the combined optical signals in order to compensate for phase modulations across the receive aperture of the optical phased array.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
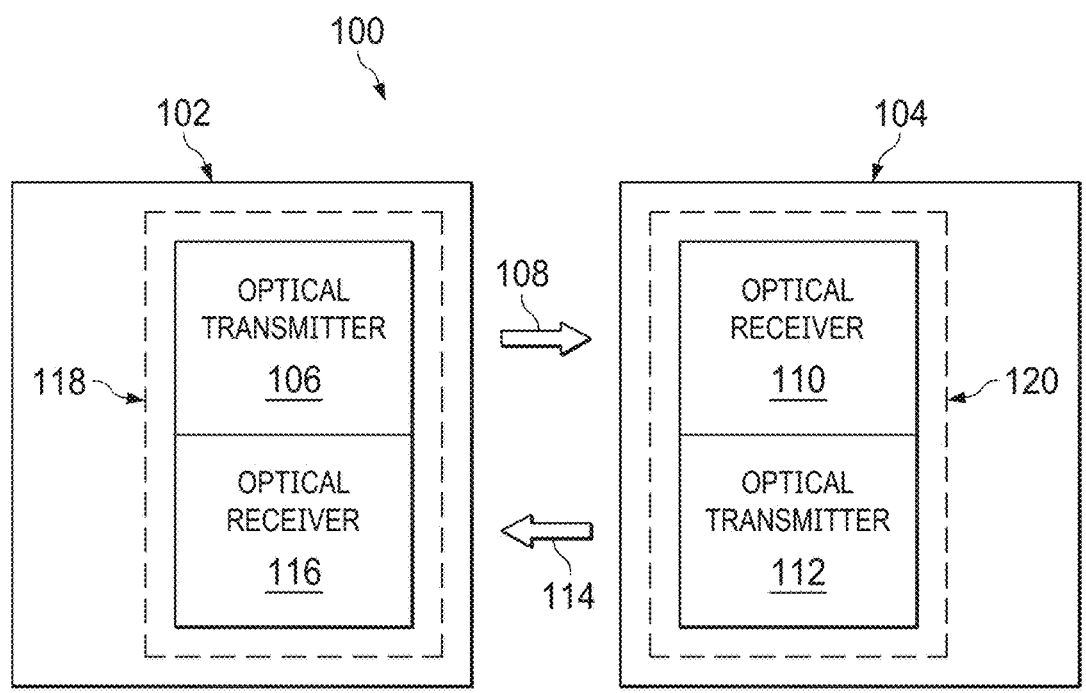
FIG. 1 illustrates an example system supporting photonic integrated circuit-based optical communication according to this disclosure.

FIGS. 1 through 11, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, next-generation optical phased arrays (OPAs) are being designed for use in free-space optical systems, which refer to systems where optical signals are transmitted and received through free space rather than through optical fibers. These optical phased arrays are often implemented using photonic integrated circuits (PICs). A photonic integrated circuit refers to a device that integrates multiple photonic or light-based functions into the device. A photonic integrated circuit may include an array of nano-antennas, which represent extremely small antennas that can be used for transmitting or receiving optical signals.

Optical phased arrays in optical transceivers and receivers are often used to coherently combine incoming optical signals. Coherently combining optical signals ideally involves combining optical signals that are aligned in phase with one another. However, coherently combining incoming optical signals can be difficult when amplitude and relative phase modulations are created in the optical signals, such as via propagation of the optical signals through the atmosphere. Amplitude and relative phase modulations of optical signals can negatively impact the performance of an optical device receiving the optical signals. Also, in some cases, a number of optical splitters/combiners are used to feed optical signals to or receive optical signals from individual antennas within the optical phased arrays. Amplitude and relative phase modulations that are present across the receive apertures of these optical phased arrays can create losses when combining optical signals. This can negatively impact the performance of the entire optical phased arrays, such as by significantly reducing the range or data rate that is achievable.

This disclosure provides for photonic integrated circuit-based optical communication optimized for receive aperture amplitude and phase modulations. As described in more detail below, an optical receiver or transceiver includes a photonic integrated circuit that implements an optical phased array and that increases or optimizes receive signal levels for incoming optical signals containing amplitude and phase modulations. For example, the photonic integrated circuit can compensate for localized amplitude modulations in the incoming optical signals, such as by providing amplification via semiconductor optical amplifiers or other amplifiers or by providing attenuation via variable attenuators. The photonic integrated circuit can also or alternatively compensate for localized phase modulations in the incoming optical signals, such as by adjusting and substantially equalizing the phases of the incoming optical signals via thermal, electro-optic, or other phase modulators. Compensations for localized amplitude modulations or phase modulations can occur for individual nano-antennas or for subgroups of nano-antennas, which can be smaller than the spatial sizes of atmospheric-induced variations caused by atmospheric propagation of the optical signals or other variations. Moreover, feedback may optionally be sent from an optical device that is receiving optical signals to an optical device that is transmitting the optical signals, and this feedback can be supported using various optical couplers, optical circulators, optical detectors, or other components coupled to the phase or amplitude compensation components.

In this way, optical devices that are receiving incoming optical signals can compensate for atmospheric-induced amplitude modulations or phase modulations caused by atmospheric propagation of the optical signals or for other undesired amplitude modulations or phase modulations. Compensating for undesired modulations within the incoming optical signals allows the incoming optical signals to be coherently combined more effectively. Among other things, this can help to increase or maximize the allowable range between transmitting and receiving optical devices or increase the data rate of communications between the transmitting and receiving optical devices. Moreover, the feedback of information from receiving optical devices to transmitting optical devices may support the use of closed-loop transmitter-receiver adaptive optic control loops between the optical devices. Among other things, this may allow for increased or maximum amounts of optical powers to be directed from the transmitting optical devices into receive apertures of the receiving optical devices.

FIG. 1 illustrates an example system 100 supporting photonic integrated circuit-based optical communication according to this disclosure. As shown in FIG. 1, the system 100 includes two nodes 102 and 104 that communicate with one another optically. Each node 102 and 104 represents a ground-, air-, or space-based system that can transmit or receive data using optical communications. In this example, the nodes 102 and 104 can engage in bidirectional communication with one another. However, this is not necessarily required, and the nodes 102 and 104 may engage in unidirectional communication with one another (meaning one node 102 or 104 may only transmit and the other node 104 or 102 may only receive, at least with respect to each other).

The node 102 in this example includes an optical transmitter 106, which generally operates to produce optical signals 108 used for communication or other purposes. For example, the optical transmitter 106 may encode information onto the optical signals 108, such as by using suitable amplitude, phase, frequency, or other modulation(s) of light. The optical signals 108 can be transmitted through free space or other transmission medium to the node 104, where an optical receiver 110 receives and processes the optical signals 108. For instance, the optical receiver 110 can identify the amplitude, phase, frequency, or other modulation(s) of light in the optical signals 108 and use the identified modulation(s) to recover the information encoded onto the optical signals 108. Any suitable type of modulation/demodulation scheme may be used here to encode and decode the optical signals 108 (assuming communication is one purpose of the optical signals 108). Since the nodes 102 and 104 are bidirectional in this example, the same process can be used in the opposite direction, meaning an optical transmitter 112 of the node 104 produces optical signals 114 that are transmitted towards the node 102 and received and processed by an optical receiver 116 of the node 102.

Note that while the optical transmitter 106 and the optical receiver 116 are shown here as separate components, they can be integrated into a single optical transceiver 118. This may allow, for example, the same PIC-based structure to be used for both transmission and reception purposes. Similarly, while the optical transmitter 112 and the optical receiver 110 are shown here as separate components, they can be integrated into a single optical transceiver 120. This may allow, for instance, the same PIC-based structure to be used for both transmission and reception purposes.

As described in more detail below, each of the optical transmitters 106 and 112, optical receivers 110 and 116, or optical transceivers 118 and 120 includes at least one photonic integrated circuit that implements at least one optical phased array. In at least the optical receivers 110 and 116 or the optical transceivers 118 and 120, the photonic integrated circuit supports optical communication optimized for receive aperture amplitude and phase modulations. This allows the optical receivers 110 and 116 or the optical transceivers 118 and 120 to compensate for amplitude modulations or phase modulations within the optical signals 108 or 114 caused by disturbances such as atmospheric propagation. Optionally, feedback can also be provided from a receiving node 102 or 104 to a transmitting node 104 or 102 to allow for closed-loop adaptive optic control between the nodes 102 and 104.

The optical transmitters, receivers, and transceivers described in this disclosure may find use in a large number of applications. For example, optical transmitters, receivers, or transceivers may be used in data centers or telecommunication systems to transport information rapidly between locations, including the transport of large amounts of information over very large distances. Optical transmitters, receivers, or transceivers may be used in consumer or commercial electronic devices, biomedical devices, or advanced computing devices to support optical-based communications with those devices. Optical transmitters, receivers, or transceivers may be used in airplanes, drones, satellites, autonomous vehicles, rockets, missiles, or other commercial or defense-related systems. Optical transmitters, receivers, or transceivers may be used in non-communication-related optical applications, such as laser detection and ranging (LADAR) applications or other applications that can use polarimetric processing with PIC-based optical phased arrays. In general, this disclosure is not limited to any particular application of the optical transmitters, receivers, and transceivers.

Although FIG. 1 illustrates one example of a system 100 supporting photonic integrated circuit-based optical communication, various changes may be made to FIG. 1. For example, while only two nodes 102 and 104 are shown here, the system 100 may include any suitable number of nodes that engage in any suitable unidirectional, bidirectional, or other communications or other interactions with each other. Also, each node of the system 100 may include any suitable number of optical transmitters, receivers, or transceivers that communicate or otherwise use any number of optical signals. In addition, the system 100 is shown in simplified form here and may include any number of additional components in any suitable configuration as needed or desired.

Figure 2:
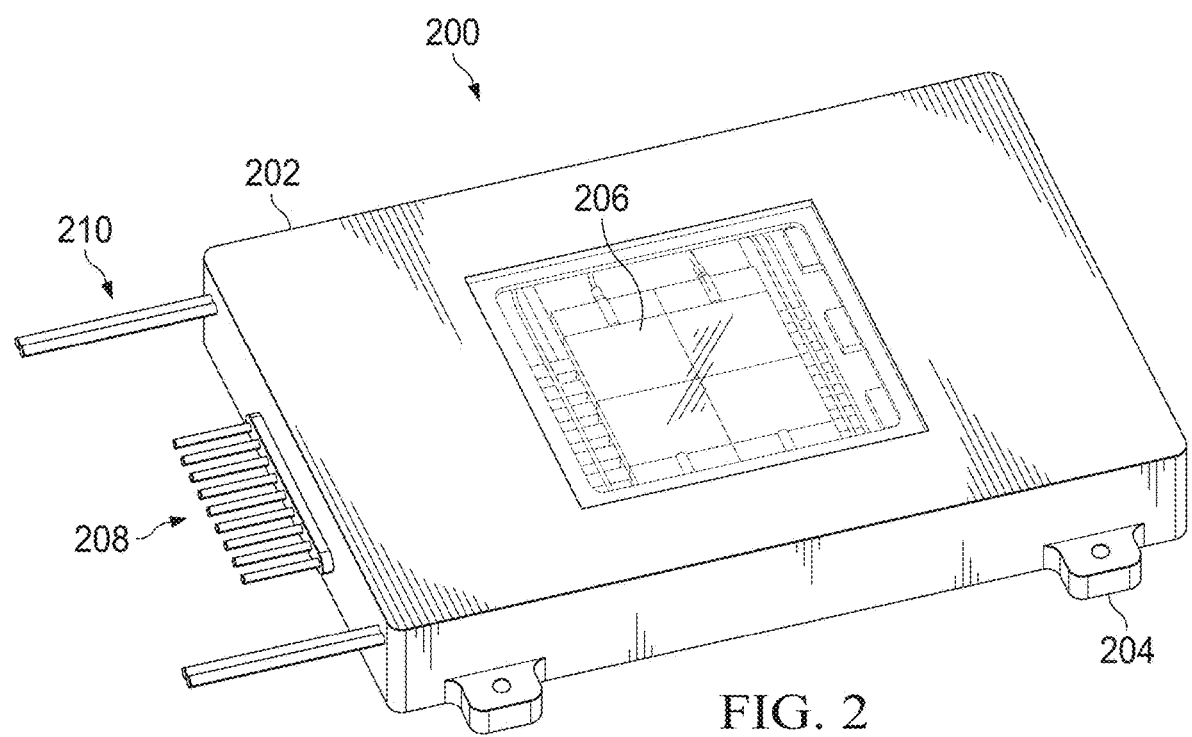
FIGS. 2 and 3 illustrate an example optical device supporting photonic integrated circuit-based optical communication optimized for receive aperture amplitude and phase modulations according to this disclosure.
Figure 3:
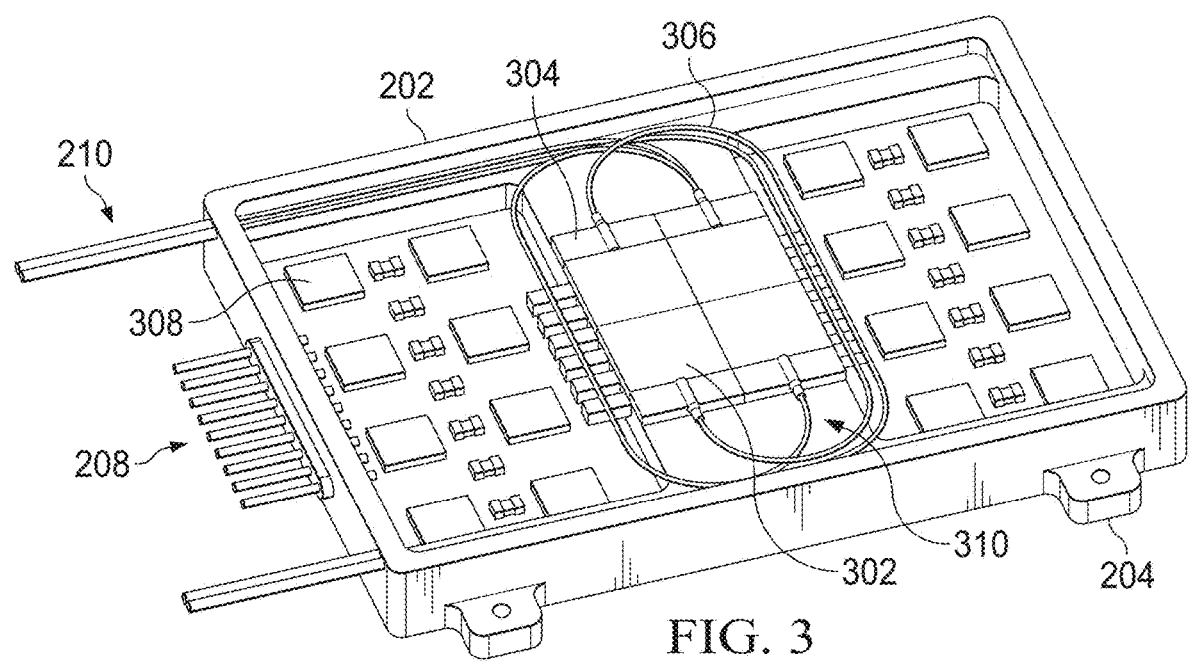

FIGS. 2 and 3 illustrate an example optical device 200 supporting photonic integrated circuit-based optical communication optimized for receive aperture amplitude and phase modulations according to this disclosure. For ease of explanation, the optical device 200 may be described as being used to at least partially implement each of the optical transmitters 106, 112, optical receivers 110, 116, or optical transceivers 118, 120 in FIG. 1. However, each of the optical transmitters, optical receivers, or optical transceivers may be implemented in any other suitable manner. Also, the optical device 200 may be used in any other suitable device and in any other suitable system.

As shown in FIG. 2, the optical device 200 includes a package 202, which surrounds and protects electronic and optical components of an optical transmitter, optical receiver, or optical transceiver. For example, the package 202 may encase and form a hermetic seal around the electronic and optical components. The package 202 may be formed from any suitable material(s), such as one or more metals, and in any suitable manner. In some embodiments, the package 202 is formed using a nickel-cobalt or nickel-iron alloy (such as KOVAR) or other material that has a coefficient of thermal expansion closely matched to that of borosilicate or other glass. The package 202 may also have any suitable size, shape, and dimensions. In some cases, the package 202 may be formed in multiple parts that can be bonded, sealed, or otherwise coupled together to enclose the electronic and optical components. For instance, the package 202 may be formed using a larger lower portion and an upper cover such that the electronic and optical components can be inserted into the lower portion and the upper cover can be connected to the lower portion. Also, in some cases, the package 202 may include flanges 204 that support mounting of the package 202 to a larger structure. However, the package 202 may have any other suitable form.

The package 202 includes an optical window 206, which is substantially or completely transparent optically (at least with respect to the optical signals being transmitted from or received by the optical device 200). The optical window 206 may be formed from any suitable material(s), such as borosilicate glass or other glass, and in any suitable manner. The optical window 206 may also have any suitable size, shape, and dimensions. In some cases, the optical window 206 may also function as a bandpass or other optical filter that filters the wavelength(s) of the optical signals being transmitted from or received by the optical device 200.

The package 202 may also include one or more electrical feedthroughs 208, which represent one or more electrical connections that can be used to transport one or more electrical signals between the interior and the exterior of the package 202. The one or more electrical signals may be used here for any suitable purposes, such as to control one or more operations of the optical device 200. In addition, the package 202 may include one or more fiber inputs/outputs 210, which can be used to provide one or more input signals to the optical device 200 or receive one or more output signals from the optical device 200. The one or more input signals may carry information to be transmitted from the optical device 200. The one or more output signals may carry information received at and recovered by the optical device 200. In this example, there are two fiber inputs/outputs 210, although the optical device 200 may include a single fiber input/output 210 or more than two fiber inputs/outputs 210. Note, however, that no fiber inputs/outputs 210 may be needed if all optical generation and processing occurs using components within the package 202, in which case the electrical feedthroughs 208 may be used to transport information to or from the optical device 200.

As shown in FIG. 3, a photonic integrated circuit 302 is positioned within the package 202, namely at a location where the photonic integrated circuit 302 can transmit or receive optical signals through the optical window 206. The photonic integrated circuit 302 may, for example, include a PIC-based optical phased array as described in more detail below. The photonic integrated circuit 302 can be used to support optical transmission or optical reception, depending on the design of the photonic integrated circuit 302. The photonic integrated circuit 302 may also support a number of additional optical functions as needed or desired. The photonic integrated circuit 302 may be formed from any suitable material(s), such as silicon, indium phosphide, or gallium arsenide, and in any suitable manner. The photonic integrated circuit 302 may also have any suitable size, shape, and dimensions. As a particular example, the photonic integrated circuit 302 may be square and have an edge length of about 40 mm, although any other suitable sizes and shapes may be used here.

Fiber mounts 304 are used to couple to optical fibers 306 at locations where the optical fibers 306 can provide optical signals to or receive optical signals from the photonic integrated circuit 302. For example, the optical fibers 306 may provide optical signals from a source laser to the photonic integrated circuit 302 for use during outgoing transmissions. The optical fibers 306 may also or alternatively provide optical signals received by the photonic integrated circuit 302 to a receiver for processing. Each fiber mount 304 includes any suitable structure configured to be coupled to an optical fiber 306. Each optical fiber 306 represents any suitable length of an optical medium configured to transport optical signals to or from a photonic integrated circuit 302. Note that while four fiber mounts 304 and four optical fibers 306 are shown here, the optical device 200 may include, one, two, three, or more than four fiber mounts 304 and optical fibers 306. Also note that no fiber mounts 304 and optical fibers 306 may be needed if all optical generation or processing occurs using components of the photonic integrated circuit 302.

An electronic control board 308 includes electronic components, such as one or more integrated circuit chips and other components, that control the operation of the photonic integrated circuit 302. For example, the electronic control board 308 may include one or more components that calculate desired phase corrections for optical signals to be generated by antenna elements of the photonic integrated circuit 302, which allows the electronic control board 308 to control functions such as beam forming or beam steering operations. Also or alternatively, the electronic control board 308 may include one or more components that calculate desired phase corrections for optical signals received by antenna elements of the photonic integrated circuit 302, which allows the electronic control board 308 to control functions such as wavefront reconstruction operations. In addition, the electronic control board 308 may calculate amplitude corrections or phase corrections used to support optical communication optimized for receive aperture amplitude and phase modulations as described in more detail below. Note, however, that at least some of the amplitude corrections or phase corrections may be determined by the photonic integrated circuit 302 itself, in which case the photonic integrated circuit 302 and not the electronic control board 308 can be used to identify those amplitude corrections or phase corrections. The electronic control board 308 includes any suitable components configured to perform one or more desired functions related to a photonic integrated circuit 302.

Spacers 310 may be positioned on opposite sides of the photonic integrated circuit 302 and used to help separate the optical fibers 306 from the electronic control board 308. The spacers 310 may be formed from any suitable material(s), such as ceramic, and in any suitable manner.

Although FIGS. 2 and 3 illustrate one example of an optical device 200 supporting photonic integrated circuit-based optical communication optimized for receive aperture amplitude and phase modulations, various changes may be made to FIGS. 2 and 3. For example, one or more photonic integrated circuits may be packaged in any other suitable manner, arranged relative to other components in any other suitable manner, and coupled to other components in any other suitable manner.

Figure 4A:
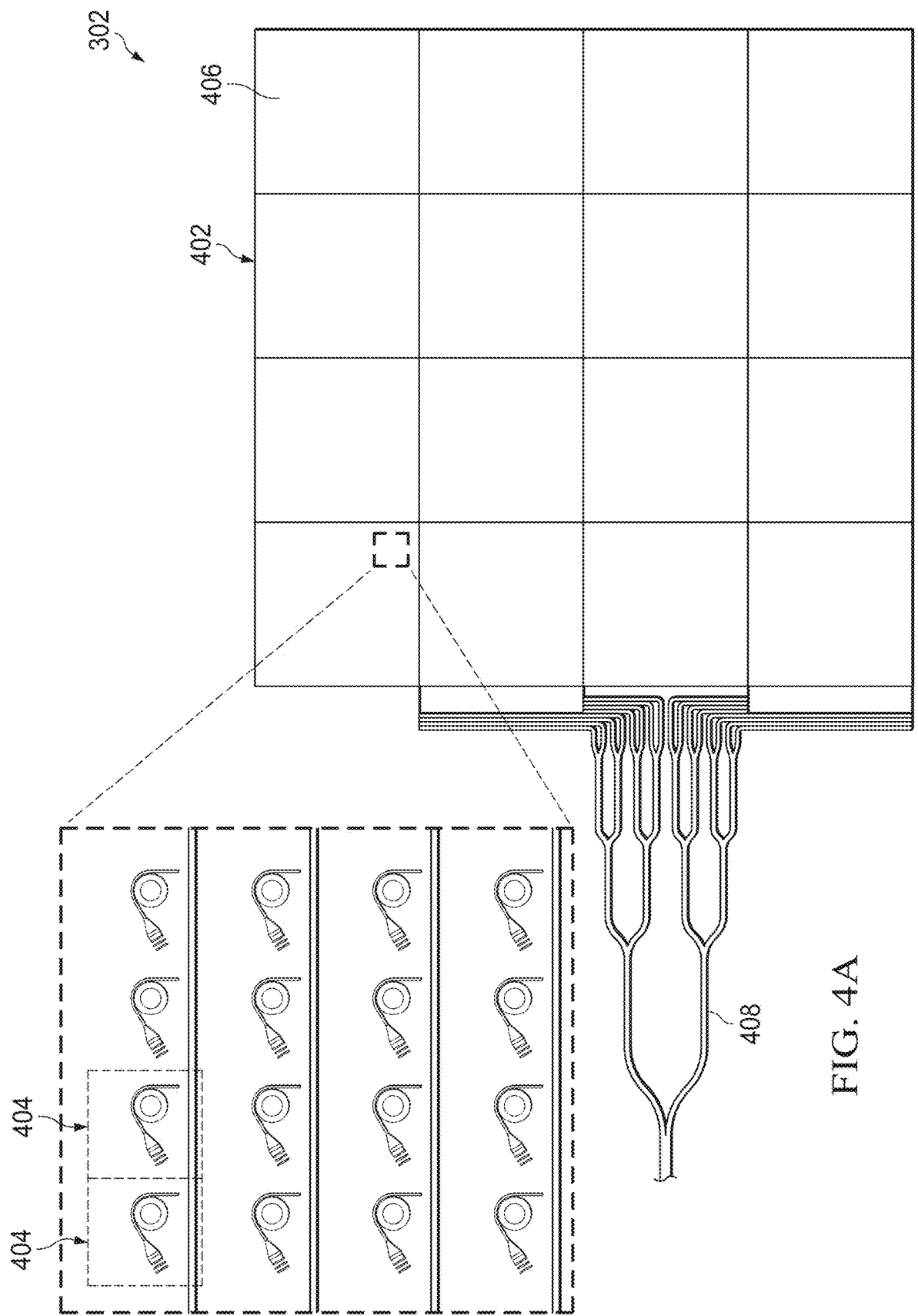
FIGS. 4A and 4B illustrate an example photonic integrated circuit supporting optical communication optimized for receive aperture amplitude and phase modulations according to this disclosure.
Figure 4B:
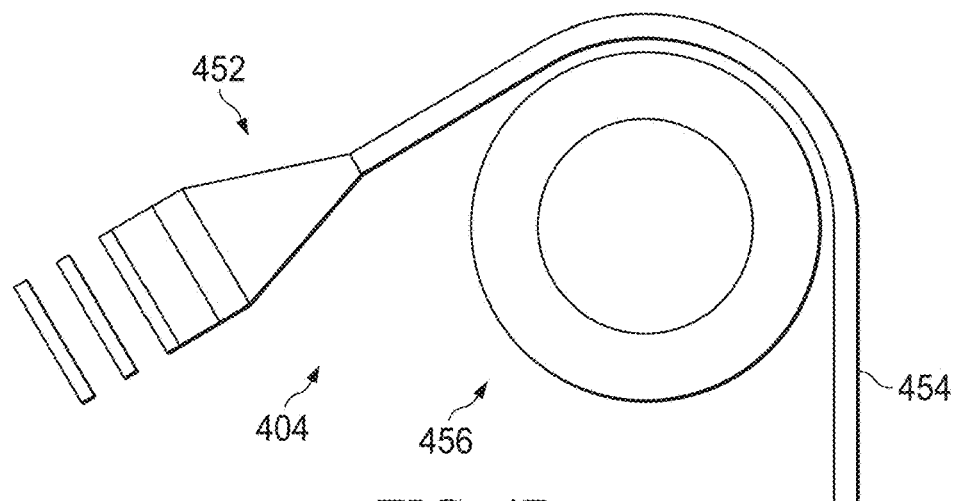

FIGS. 4A and 4B illustrate an example photonic integrated circuit 302 supporting optical communication optimized for receive aperture amplitude and phase modulations according to this disclosure. For ease of explanation, the photonic integrated circuit 302 is described as being used in the optical device 200, which may be used to at least partially implement each of the optical transmitters 106, 112, optical receivers 110, 116, or optical transceivers 118, 120 in FIG. 1. However, the photonic integrated circuit 302 may be used in any other suitable device and in any other suitable system.

As shown in FIG. 4A, the photonic integrated circuit 302 includes a PIC-based optical phased array 402, where the optical phased array 402 includes a large number of unit cells 404. Each unit cell 404 is configured to transmit or receive one or more optical signals. The optical phased array 402 can include any suitable number of unit cells 404, possibly up to and including a very large number of unit cells 404. In some embodiments, for example, the optical phased array 402 may include an array of unit cells 404 up to a size of 1024×1024 (meaning over one million unit cells 404) or even larger. Also, the optical phased array 402 may include multiple groups 406 of unit cells 404, where the unit cells 404 in each group 406 are fed an outgoing optical signal or are used to generate an incoming optical signal. In some embodiments, for example, the optical phased array 402 may include sixteen groups 406 of unit cells 404 arranged in a 4×4 pattern, although other numbers and arrangements of groups 406 of unit cells 404 may be used. The size of the optical phased array 402 is based, at least in part, on the number and size of the unit cells 404 and the number and arrangement of the groups 406. As a particular example, in some cases, the optical phased array 402 may be square with edges of about 1.6 mm in length. However, the optical phased array 402 may be scaled to smaller or larger sizes as needed or desired.

A feed network 408 is used to split outgoing optical signals for transmission by the optical phased array 402 or to combine incoming optical signals received by the optical phased array 402. For example, the feed network 408 may include a collection of splitters/combiners that can divide optical signals flowing in one direction through the feed network 408 and combine optical signals flowing in the opposite direction through the feed network 408. In some cases, the feed network 408 can be designed to feed optical signals to or receive optical signals from the groups 406 of unit cells 404. Additional components within the optical phased array 402 (such as within each group 406 of unit cells 404) may be used to provide optical signals to or receive optical signals from the individual unit cells 404 within the optical phased array 402. The feed network 408 includes any suitable structures configured to distribute or combine optical signals. While a specific configuration of a feed network 408 is shown here, the actual design of the feed network 408 can vary based on a number of factors, such as the design of the optical phased array 402.

As shown in FIG. 4B, each unit cell 404 includes an antenna element 452, which is configured to physically transmit or receive one or more optical signals to or from one or more external devices or systems. For example, each antenna element 452 may represent a nanophotonic antenna or other antenna element that transmits or receives at least one optical signal, along with one or more lenses or other optical devices configured to focus or otherwise process the at least one optical signal. Depending on the implementation, the antenna element 452 may sometimes be referred to as an emitter in a transmitting array or a receiver in a receiving array. Each antenna element 452 may have any suitable size, shape, and dimensions. In some cases, the emitting/receiving surface of the antenna element 452 may be about 3 μm to about 4 μm in diameter.

Each antenna element 452 here is coupled to a signal pathway 454. The signal pathways 454 are configured to transport optical signals to or from the antenna elements 452. For example, the signal pathways 454 can provide optical signals to the antenna elements 452 for transmission. Also or alternatively, the signal pathways 454 can provide optical signals received by the antenna elements 452 to optical detectors or other components for processing, such as via the feed network 408. Each signal pathway 454 includes any suitable structure configured to transport optical signals, such as an optical waveguide. Note that only a portion of the signal pathway 454 may be shown in FIG. 4B, since a signal pathway 454 can vary based on how the associated unit cell 404 is designed and positioned within the optical phased array 402.

A phase modulator 456 is provided for each antenna element 452 and is used (among other things) to control the phases of optical signals transmitted or received by the associated antenna element 452. For example, when the antenna elements 452 are transmitting, the phase modulators 456 can be used to achieve desired phases of outgoing optical signals in order to perform beam forming or beam steering. When the antenna elements 452 are receiving, the phase modulators 456 can be used to apply phase control to the incoming wavefront of received optical signals in order to decompose or reconstruct the wavefront. Each phase modulator 456 includes any suitable structure configured to modulate the phase of an optical signal, such as a resonant micro-ring modulator or a PN junction micro-ring modulator. In some cases, each phase modulator 456 may be a resonant micro-ring modulator that is about 5.5 μm to about 6 μm in diameter, although modulators of other sizes may be used here.

Each unit cell 404 shown here may have any suitable size, shape, and dimensions. In some embodiments, each unit cell 404 is substantially square in shape and has dimensions of about 12 μm by about 12 μm. However, the overall size, shape, and dimensions of each unit cell 404 can vary based on various factors, such as the size, shape, dimensions, and arrangement of its individual components. Note that the path lengths associated with the antenna elements 452 in the unit cells 404 can be closely matched to one another. In some cases, the path lengths can be matched at the sub-wavelength level. Along with other functions described below, this can allow for coherent recombination of optical signals (such as when light at the TE0 or TM0 waveguide mode is used).

Although FIGS. 4A and 4B illustrate one example of a photonic integrated circuit 302 supporting optical communication optimized for receive aperture amplitude and phase modulations, various changes may be made to FIGS. 4A and 4B. For example, the optical phased array 402 may have any other suitable size and shape, and any other suitable feed network 408 may be used. Also, while the feed network 408 is shown here as residing next to the optical phased array 402, the feed network 408 may be located in any other suitable position(s), such as under the optical phased array 402.

Figure 5A:
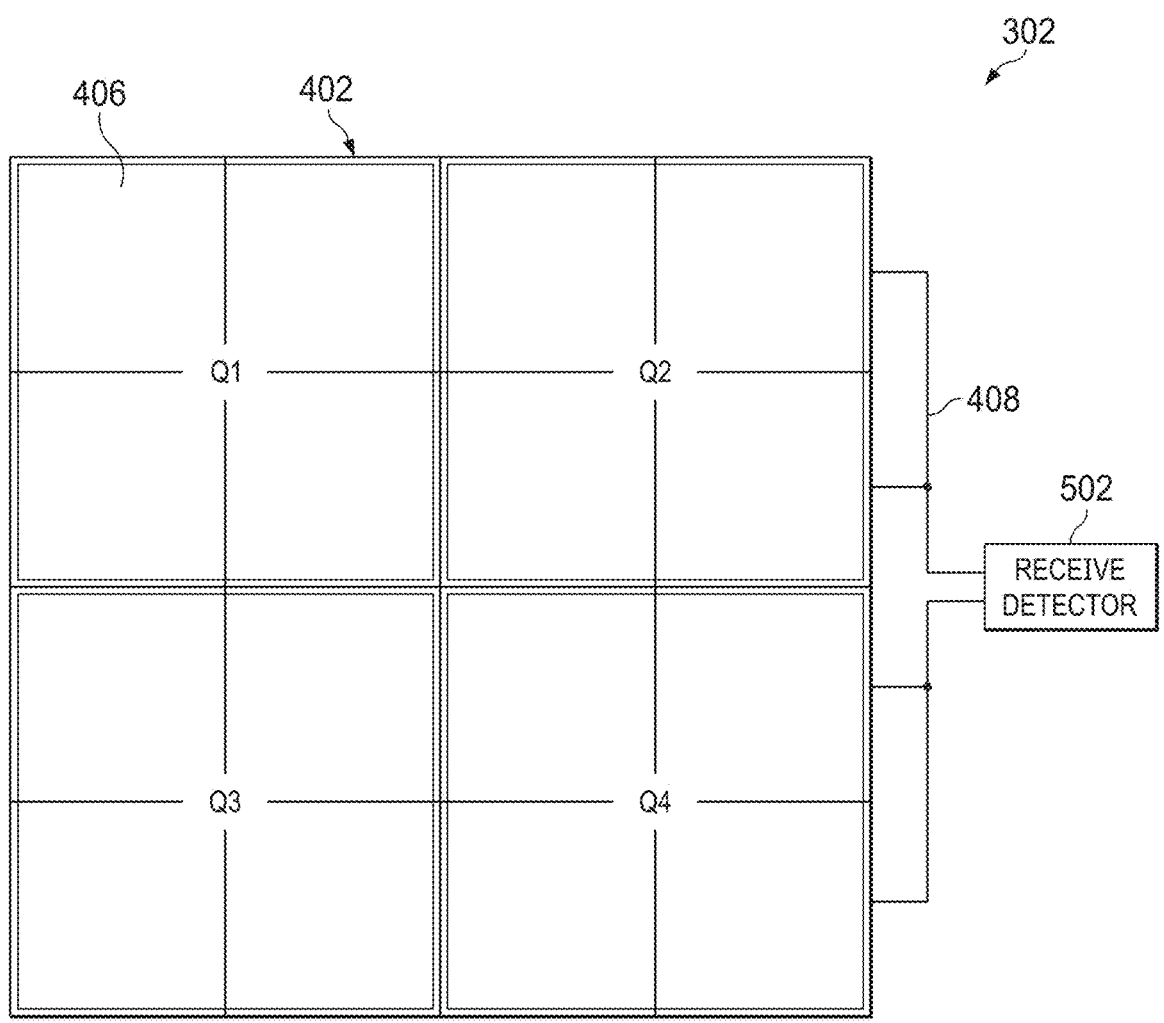
FIGS. 5A and 5B illustrate example operations of a photonic integrated circuit supporting optical communication optimized for receive aperture amplitude and phase modulations according to this disclosure.
Figure 5B:
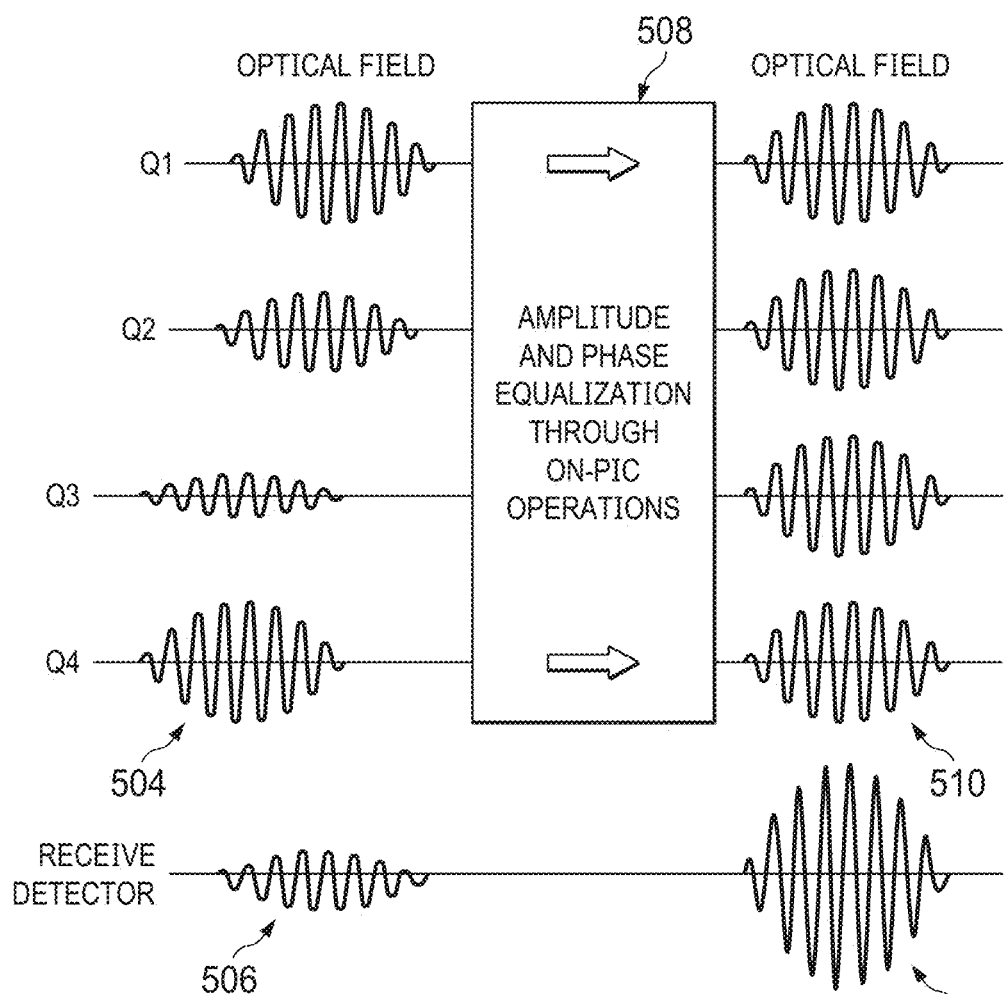

FIGS. 5A and 5B illustrate example operations of a photonic integrated circuit 302 supporting optical communication optimized for receive aperture amplitude and phase modulations according to this disclosure. For ease of explanation, the photonic integrated circuit 302 is described as being used in the optical device 200, which may be used to at least partially implement each of the optical transmitters 106, 112, optical receivers 110, 116, or optical transceivers 118, 120 in FIG. 1. However, the photonic integrated circuit 302 may be used in any other suitable device and in any other suitable system. Also, the photonic integrated circuit 302 is described as having the form shown in FIGS. 4A and 4B. However, the photonic integrated circuit 302 may have any other suitable design that supports the use of a suitable PIC-based optical phased array.

As shown in FIG. 5A, the photonic integrated circuit 302 is being used to receive optical signals and feed the received optical signals to a receive detector 502 via the feed network 408. In this particular example, the optical phased array 402 of the photonic integrated circuit 302 has been divided into four quadrants Q1-Q4, where each quadrant includes four groups 406 of unit cells 404. The optical signals collectively received by the unit cells 404 of each quadrant are combined, and the feed network 408 here combines the four resulting outputs to produce combined optical signals that are provided to the receive detector 502.

The receive detector 502 generally operates to process the combined optical signals in order to perform one or more functions using or based on the combined optical signals. For example, the receive detector 502 may convert the combined optical signals into electrical signals. The electrical signals can be processed in order to recover data that was encoded onto the received optical signals by a transmitting optical device. As particular examples, the electrical signals may be processed in order to recover data that was encoded using amplitude, phase, frequency, or other modulation(s).

FIG. 5B illustrates example optical signals 504 that may be generated by the four quadrants of the optical phased array 402 and combined optical signals 506 that may be generated by combining the optical signals 504 (without any compensation for amplitude and phase modulations caused by atmospheric perturbations or other sources). As can be seen here, the optical signals 504 can have significantly different amplitudes and relative phases with respect to one another. As a result, when these optical signals 504 are combined to produce the combined optical signals 506, the combined optical signals 506 have relatively low amplitudes. This can negatively impact the receiving optical device's ability to recover data from the combined optical signals 506.

FIG. 5B also illustrates how various components 508 of the photonic integrated circuit 302 may be used as described below to help compensate for amplitude and phase modulations caused by atmospheric perturbations or other sources. As can be seen here, the components 508 of the photonic integrated circuit 302 modify the optical signals 504 to produce processed optical signals 510, and the processed optical signals 510 can have amplitudes and phases that more closely match one another. As a result, when the processed optical signals 510 are combined to produce combined optical signals 512, the combined optical signals 512 can have significantly larger amplitudes. This can make it much easier for the receiving optical device to recover data from the combined optical signals 512.

Although FIGS. 5A and 5B illustrate one example of operations of a photonic integrated circuit 302 supporting optical communication optimized for receive aperture amplitude and phase modulations, various changes may be made to FIGS. 5A and 5B. For example, the number of optical signals generated by different quadrants or other collections of unit cells 404 in the optical phased array 402 can vary. Also, the specific examples of the optical signals and combined signals shown here are merely meant to illustrate how the photonic integrated circuit 302 can operate. The optical signals and the combined signals that are generated by a specific photonic integrated circuit 302 can vary depending on (among other things) the optical signals being received by that photonic integrated circuit 302 and the design of the photonic integrated circuit 302.

Figure 6:
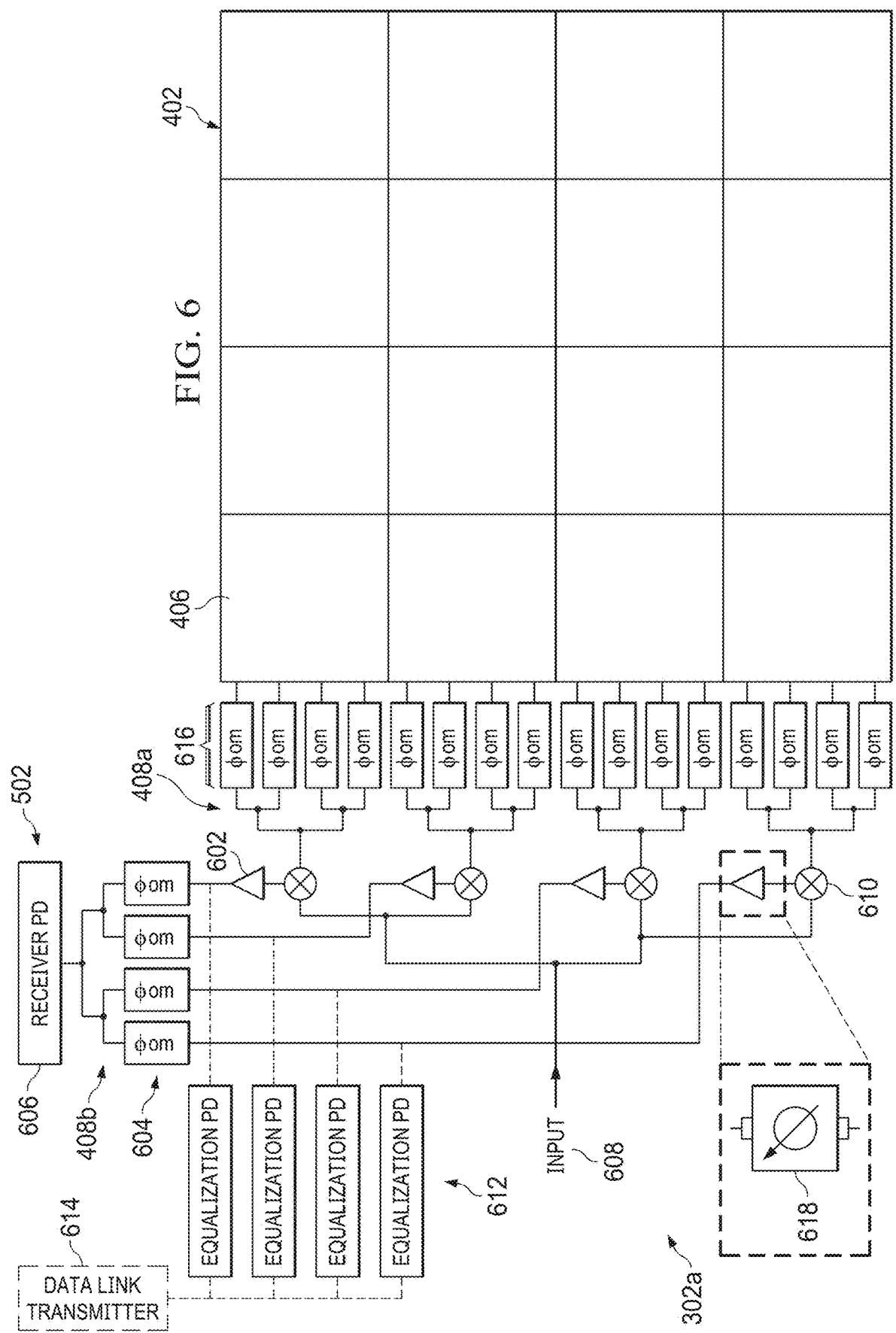
FIG. 6 illustrates an example photonic integrated circuit supporting amplitude-modulation resiliency according to this disclosure.

FIG. 6 illustrates an example photonic integrated circuit 302a supporting amplitude-modulation resiliency according to this disclosure. For ease of explanation, the photonic integrated circuit 302a is described as being used in the optical device 200, which may be used to at least partially implement each of the optical transmitters 106, 112, optical receivers 110, 116, or optical transceivers 118, 120 in FIG. 1. However, the photonic integrated circuit 302a may be used in any other suitable device and in any other suitable system. Also, the photonic integrated circuit 302a is described as having the form shown in FIGS. 4A and 4B. However, the photonic integrated circuit 302a may have any other suitable design that supports the use of a suitable PIC-based optical phased array.

As shown in FIG. 6, optical signals received by the unit cells 404 of the optical phased array 402 are provided via a first portion 408a of the feed network 408 to various optical amplifiers 602. The optical amplifiers 602 represent variable or controllable amplifiers that can amplify the intensities (amplitudes) of the received optical signals. In this example, there are four optical signals produced by combining the optical signals received by four subgroups of unit cells 404, such as unit cells 404 in the four quadrants of the optical phased array 402. As a result, there are four optical amplifiers 602 here, which are used to amplify these four optical signals. However, there may be less than four or more than four optical amplifiers 602 based (among other things) on how many optical signals are being produced by different subgroups of unit cells 404.

Each optical amplifier 602 represents any suitable structure configured to amplify optical signals, such as a semiconductor optical amplifier (SOA). The optical amplifiers 602 are controllable to provide adjustable amounts of optical amplification to the various optical signals being processed. For example, one or more of the optical amplifiers 602 may be used to adjust one or more amplitudes of one or more of the optical signals. As a particular example, one of the optical signals may be selected as a reference, and the amplitudes of the other optical signals may be modified using their associated optical amplifiers 602 to match or substantially match the amplitude of the reference signal. Overall, the optical amplifiers 602 can be used to substantially equalize the amplitudes of the optical signals being processed.

In some cases, the optical amplifiers 602 can introduce phase variations into the optical signals being amplified. As a result, phase modulators 604 are provided to process the amplified optical signals. The phase modulators 604 are controllable to provide adjustable amounts of phase modifications to the various amplified optical signals being processed. For example, one or more of the phase modulators 604 may be used to adjust one or more phases of one or more of the amplified optical signals. As a particular example, one of the amplified optical signals may be selected as a reference, and the phases of the other amplified optical signals may be modified using their associated phase modulators 604 to match or substantially match the phase of the reference signal. Overall, the phase modulators 604 can be used to substantially equalize the phases of the optical signals being processed. Each modulator 604 includes any suitable structure configured to modulate the phase of an optical signal, such as a resonant micro-ring modulator or a PN junction micro-ring modulator. Again, the number of phase modulators 604 here can vary based (among other things) on how many optical signals are being produced by different subgroups of unit cells 404.

Another portion 408b of the feed network 408 is used to combine the amplitude- and phase-adjusted optical signals and to provide the combined optical signals to the receive detector 502. In this example, the receive detector 502 may be implemented using a photodiode 606, which can convert the combined optical signals into electrical signals for further processing (although any other suitable receive detector may be used here).

In some embodiments, the photonic integrated circuit 302a supports both transmission and reception of optical signals. Thus, outgoing optical signals 608 may be received, and different portions of the outgoing optical signals 608 may be provided to the optical phased array 402 via circulators 610. Each circulator 610 represents a structure that is configured to receive a signal at one port and output the signal at the next port. This allows each circulator 610 to provide a portion of the outgoing optical signals 608 to a subgroup of unit cells 404 in the optical phased array 402 while also providing incoming optical signals as received by the same subgroup of unit cells 404 to the associated optical amplifier 602. Once again, the number of circulators 610 here can vary based (among other things) on how many optical signals are being produced by different subgroups of unit cells 404.

The photonic integrated circuit 302a may optionally support the use of feedback sent from a receiving optical device to a transmitting optical device. Here, the feedback can be produced using equalization detectors 612, such as photodetectors or other optical detectors. The equalization detectors 612 can measure the amplitudes of samples of the amplified signals produced by the optical amplifiers 602. In some cases, these measurements can be processed by the receiving optical device, and resulting information can be transmitted to the transmitting optical device via a data link 614. In other cases, these measurements can be transmitted to the transmitting optical device via the data link 614 for processing at the transmitting optical device. As particular examples, when there are optical signals generated using four subgroups of unit cells 404 in the optical phased array 402, amplitude measurements associated with the four resulting amplified optical signals may be used by the transmitting or receiving optical device to identify the tip or tilt of the receiving optical device relative to the transmitting optical device. When there are optical signals generated using more than four subgroups of unit cells 404 in the optical phased array 402, amplitude measurements associated with the resulting amplified optical signals may be used as higher-order feedback by the transmitting or receiving optical device. In either case, the transmitting optical device can use the feedback to help reduce receive aperture amplitude modulations by modifying how optical signals are generated by the transmitting optical device.

In this example, the optical signals received by the optical phased array 402 are combined, and the combined optical signals are processed using a single receive detector 502. This allows the single receive detector 502 to process an optical sum of the various amplified optical signals produced by the photonic integrated circuit 302a. In other cases, the receive detector 502 may mix the optical sum of the amplified optical signals with a local oscillator signal in order to perform coherent detection. In addition, in other embodiments, it is possible to use multiple receive detectors 502 (such as one receive detector 502 for each amplified optical signal), where the electrical signals output from the receive detectors 502 are combined to produce combined electrical signals representing the received optical signals.

Moreover, in this example, phase modulators 616 can be used to control the phases of incoming or outgoing optical signals associated with subgroups of unit cells 404 in the optical phased array 402. For example, the phases for all unit cells 404 in each subgroup can be collectively adjusted using the phase modulator 616 for that subgroup. The phase modulators 616 can be controllable as described below to provide compensation for phase modulations across the receive aperture of the optical phased array 402. Each phase modulator 616 includes any suitable structure configured to modulate the phase of an optical signal, such as a resonant micro-ring modulator or a PN junction micro-ring modulator. Note that the number of phase modulators 616 here can vary based (among other things) on how many subgroups of unit cells 404 are used to adjust the phases of incoming optical signals.

While the use of the optical amplifiers 602 to equalize the amplitudes of received optical signals is described above, other embodiments of the photonic integrated circuit 302a may use other approaches to equalize the amplitudes of the received optical signals. For example, the optical amplifiers 602 in FIG. 6 may be replaced with variable optical attenuators 618, which represent devices configured to attenuate (weaken) the amplitudes of the received optical signals in a controllable manner. The optical attenuators 618 can therefore be used to weaken selected optical signals so that their amplitudes more closely match the amplitudes of other optical signals. Thus, the photonic integrated circuit 302a may be described as including amplitude adjusters, which can either increase or decrease amplitudes of optical signals to help equalize the amplitudes of the optical signals.

Although FIG. 6 illustrates one example of a photonic integrated circuit 302a supporting amplitude-modulation resiliency, various changes may be made to FIG. 6. For example, the numbers of optical amplifiers 602, phase modulators 604, circulators 610, equalization detectors 612, and phase modulators 616 can vary as needed or desired.

Figure 7:
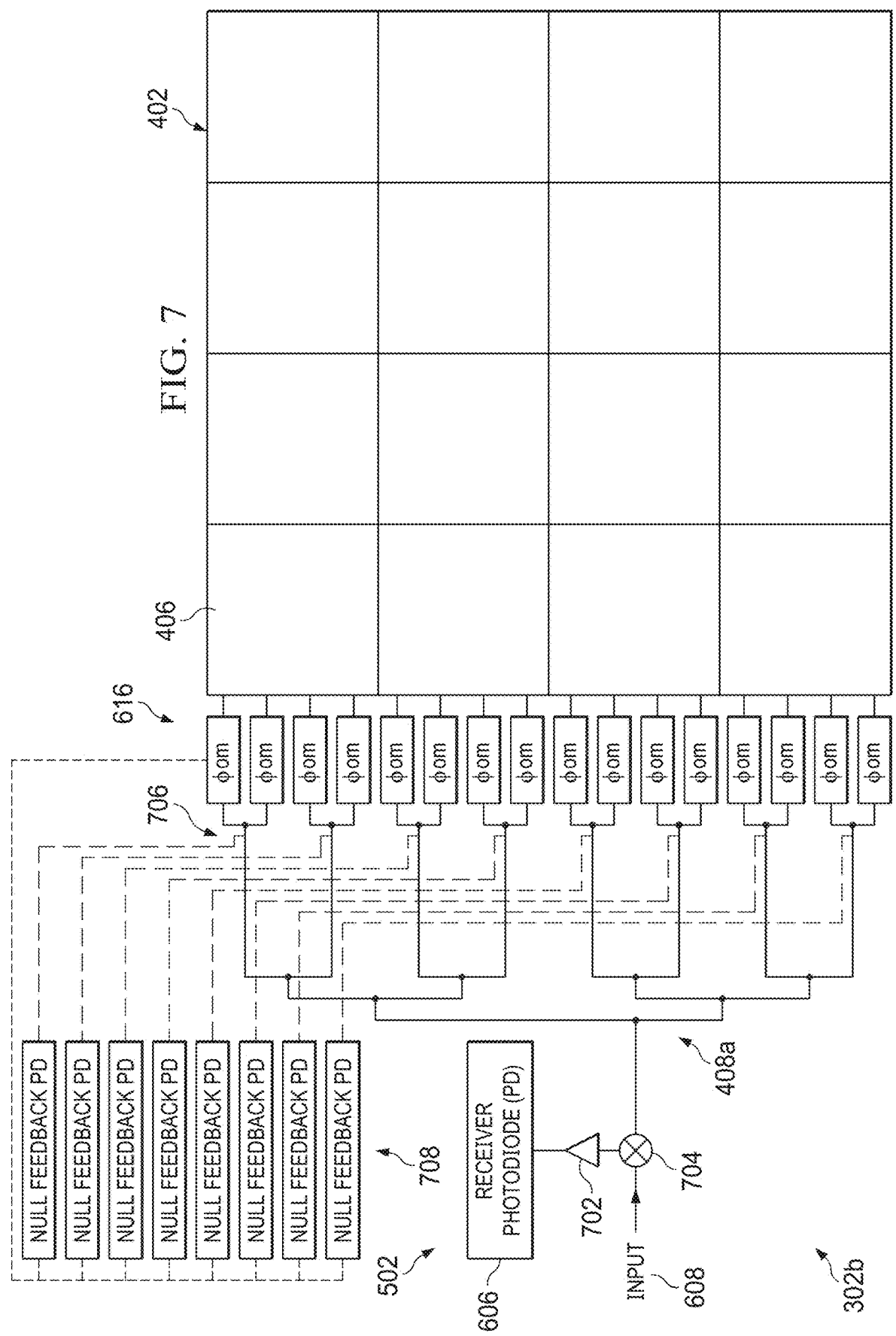
FIGS. 7 and 8 illustrate example photonic integrated circuits supporting phase-modulation resiliency according to this disclosure.
Figure 8:
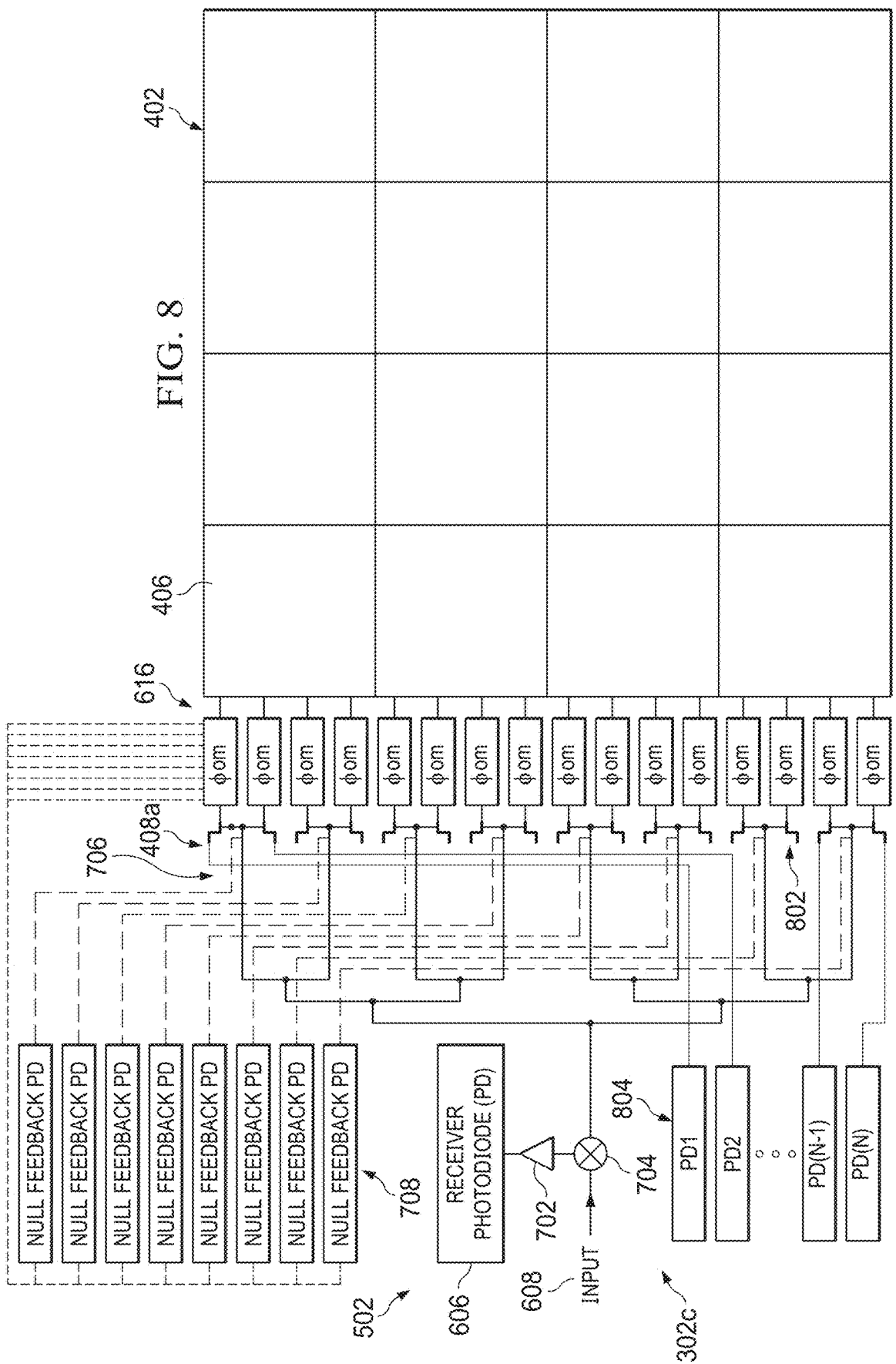

FIGS. 7 and 8 illustrate example photonic integrated circuits 302b-302c supporting phase-modulation resiliency according to this disclosure. For ease of explanation, the photonic integrated circuits 302b-302c are described as being used in the optical device 200, which may be used to at least partially implement each of the optical transmitters 106, 112, optical receivers 110, 116, or optical transceivers 118, 120 in FIG. 1. However, each of the photonic integrated circuits 302b-302c may be used in any other suitable device and in any other suitable system. Also, the photonic integrated circuits 302b-302c are described as having the form shown in FIGS. 4A and 4B. However, each of the photonic integrated circuits 302b-302c may have any other suitable design that supports the use of a suitable PIC-based optical phased array.

As shown in FIG. 7, the photonic integrated circuit 302b uses the phase modulators 616 to modulate the phases of incoming optical signals generated based on optical signals received by different subgroups of unit cells 404 in the optical phased array 402. In this particular example, there are sixteen phase modulators 616, which can be used to adjust the phases of optical signals as received by sixteen groups 406 of unit cells 404. However, the specific number of phase modulators 616 used in the photonic integrated circuit 302b can vary. The phase modulators 616 are controllable to provide adjustable amounts of phase modifications to the various optical signals. For instance, one of the optical signals may be selected as a reference, and the phases of the other optical signals may be modified using their associated phase modulators 616 to match or substantially match the phase of the reference signal. Overall, the phase modulators 616 can be used to substantially equalize the phases of the optical signals being processed. The phase-equalized optical signals can be combined via the feed network 408, and an amplifier 702 can be used to amplify the combined optical signals and provide the amplified optical signals to the receive detector 502.

In some embodiments, the photonic integrated circuit 302b supports both transmission and reception of optical signals. Thus, the outgoing optical signals 608 may be received and provided to the optical phased array 402 via a circulator 704. The circulator 704 can provide the outgoing optical signals 608 to the optical phased array 402 while also providing the combined incoming optical signals as produced using outputs of the phase modulators 616 to the amplifier 702.

In this example, the phase modulators 616 are controlled by sampling the optical signals output from the phase modulators 616 using couplers 706, such as by using 2×2 optical couplers (each of which may, in some cases, be formed using two separate 1×2 optical couplers). The sampled portions of the phase modulators' outputs are provided to feedback detectors 708, such as photodetectors or other optical detectors. The feedback detectors 708 can be used to measure the phases of the sampled portions of the phase modulators' outputs. The phase measurements by the feedback detectors 708 can be used to determine how to adjust the phase modulators 616 so that the phase modulators' outputs are completely or substantially in phase with one another.

In some embodiments, the feedback detectors 708 can adjust the phases of the outputs of the phase modulators 616 by nulling the return arms of the 1×2 couplers forming the right portions of the 2×2 couplers (couplers 706) in FIG. 7. That is, each feedback detector 708 can provide a null signal to the upper right path of the associated 2×2 coupler in FIG. 7. This helps to alter the phases of the optical signals that are provided on the other arms of the 1×2 couplers (the bottom right paths of the 2×2 couplers in FIG. 7).

The photonic integrated circuit 302c shown in FIG. 8 has a similar structure as the photonic integrated circuit 302b shown in FIG. 7. In addition, the photonic integrated circuit 302c includes tap couplers 802, which can sample the optical signals output from the phase modulators 616 and provide the samples of the optical signals to additional optical detectors 804, such as photodetectors. The optical detectors 804 can measure the intensities of the sampled optical signals, and the measured intensities can be used in one or more ways by the photonic integrated circuit 302c. For example, the measured intensities may be used to trigger feedback to a transmitting optical device only when signals are present at an intensity greater than a specified threshold. As another example, the measured intensities may be used to normalize the null signal levels that are used across the optical phased array 402.

In this way, the photonic integrated circuits 302b-302c shown here can be used to reduce or minimize the effects of phase modulations across a receive aperture on signal levels provided to a receiver detector. In some cases, the optical signals received by the subgroups of unit cells 404 in the optical phased array 402 can be phased to optimize the signal levels provided to the receive detector. In particular embodiments, the subgroups of unit cells 404 in the optical phased array 402 can spatially smaller than the RO parameter of the phase wavefront of the incoming optical signals.

Although FIGS. 7 and 8 illustrate examples of photonic integrated circuits 302b-302c supporting phase-modulation resiliency, various changes may be made to FIGS. 7 and 8. For example, the numbers of phase modulators 616, feedback detectors 708, and additional detectors 804 can vary as needed or desired. Also, while not shown here for clarity, a combination of the design shown in FIG. 6 and the design shown in FIG. 7 or FIG. 8 can be used together in the same photonic integrated circuit. This would allow the photonic integrated circuit to support both amplitude-modulation resiliency and phase-modulation resiliency. In addition, while not shown here, phases detected by the photonic integrated circuit 302b or 302c or information based on the phases detected by the photonic integrated circuit 302b or 302c may be provided to the transmitting optical device as feedback, such as via the data link 614.

Figure 9:
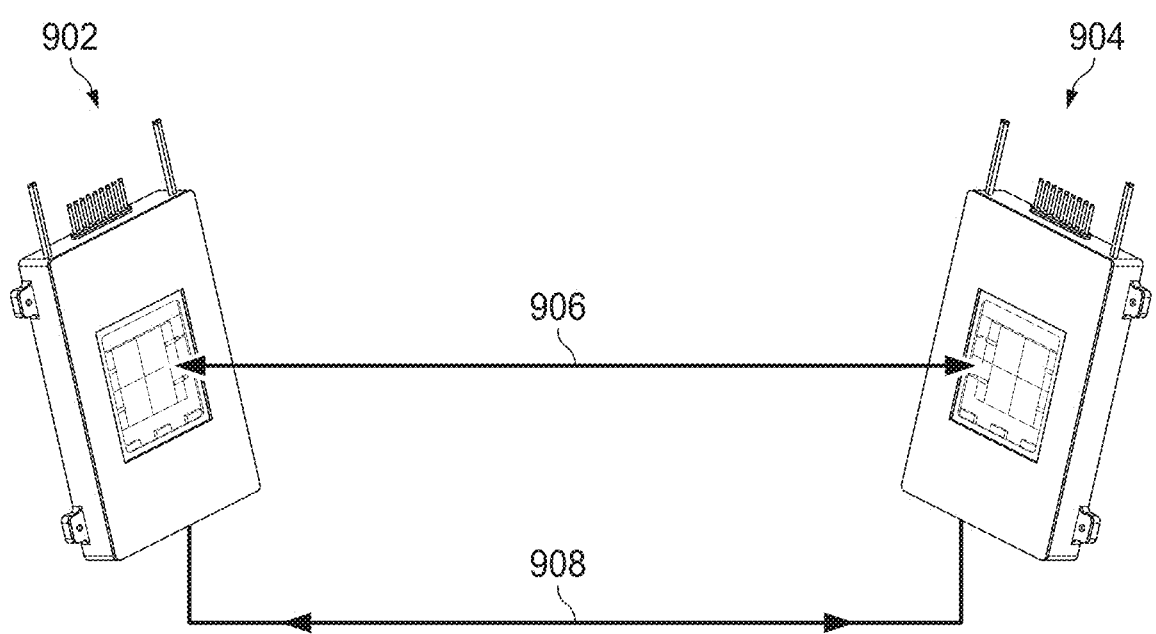
FIG. 9 illustrates example interactions of optical devices supporting photonic integrated circuit-based optical communication optimized for receive aperture amplitude and phase modulations according to this disclosure.

FIG. 9 illustrates example interactions of optical devices 902-904 supporting photonic integrated circuit-based optical communication optimized for receive aperture amplitude and phase modulations according to this disclosure. For ease of explanation, the optical devices 902-904 may include any of the photonic integrated circuits 302, 302a-302c described above. As shown in FIG. 9, the photonic integrated circuits of the optical devices 902-904 can be used to support the exchange of information over an optical pathway 906 between the optical devices 902-904. The optical pathway 906 can represent free space or other transmission medium through which optical signals encoded with information travel between the optical devices 902-904. In some embodiments where feedback of information is used, the feedback can be provided optically from the receiving optical device 902 or 904 to the transmitting optical device 904 or 902. That is, the receiving optical device may encode the feedback into optical data signals, optical beacons, or other optical signals sent to the transmitting optical device.

Another communication pathway 908 may optionally exist between the optical devices 902-904, such as a radio frequency (RF) communication pathway. In other embodiments where feedback of information is used, the feedback can be provided from the receiving optical device 902 or 904 to the transmitting optical device 904 or 902 over the communication pathway 908. While the communication pathway 908 may have a lower bandwidth compared to the optical pathway 906, the communication pathway 908 can still be useful in providing feedback information from the receiving optical device to the transmitting optical device.

Although FIG. 9 illustrates one example of interactions of optical devices 902-904 supporting photonic integrated circuit-based optical communication optimized for receive aperture amplitude and phase modulations, various changes may be made to FIG. 9. For example, the optical devices 902-904 may have any other suitable forms. Also, each of the optical devices 902-904 may or may not be used to communicate with other optical devices not shown in FIG. 9.

Figure 10:
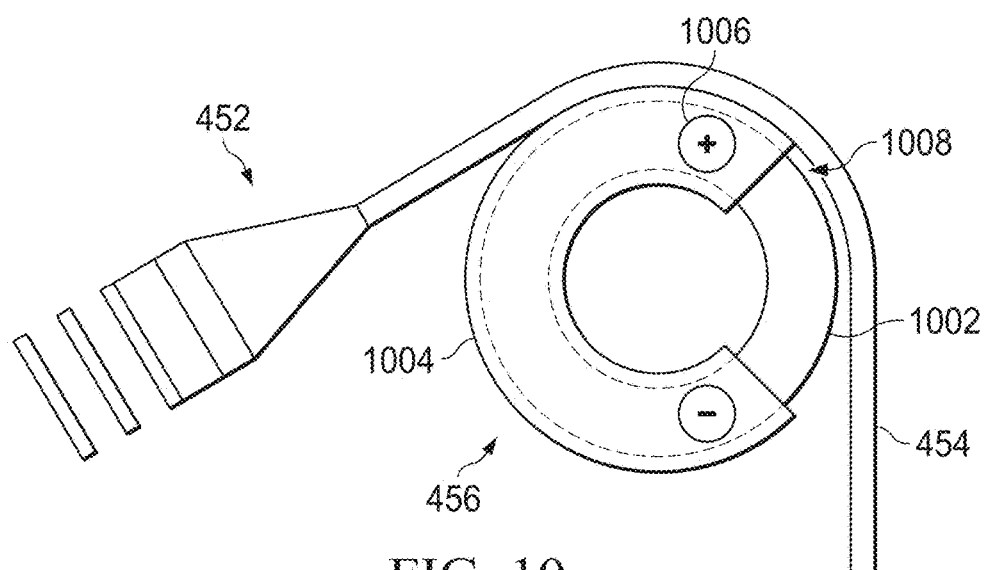
FIGS. 10 and 11 illustrate example phase modulators for use in a photonic integrated circuit according to this disclosure.
Figure 11:
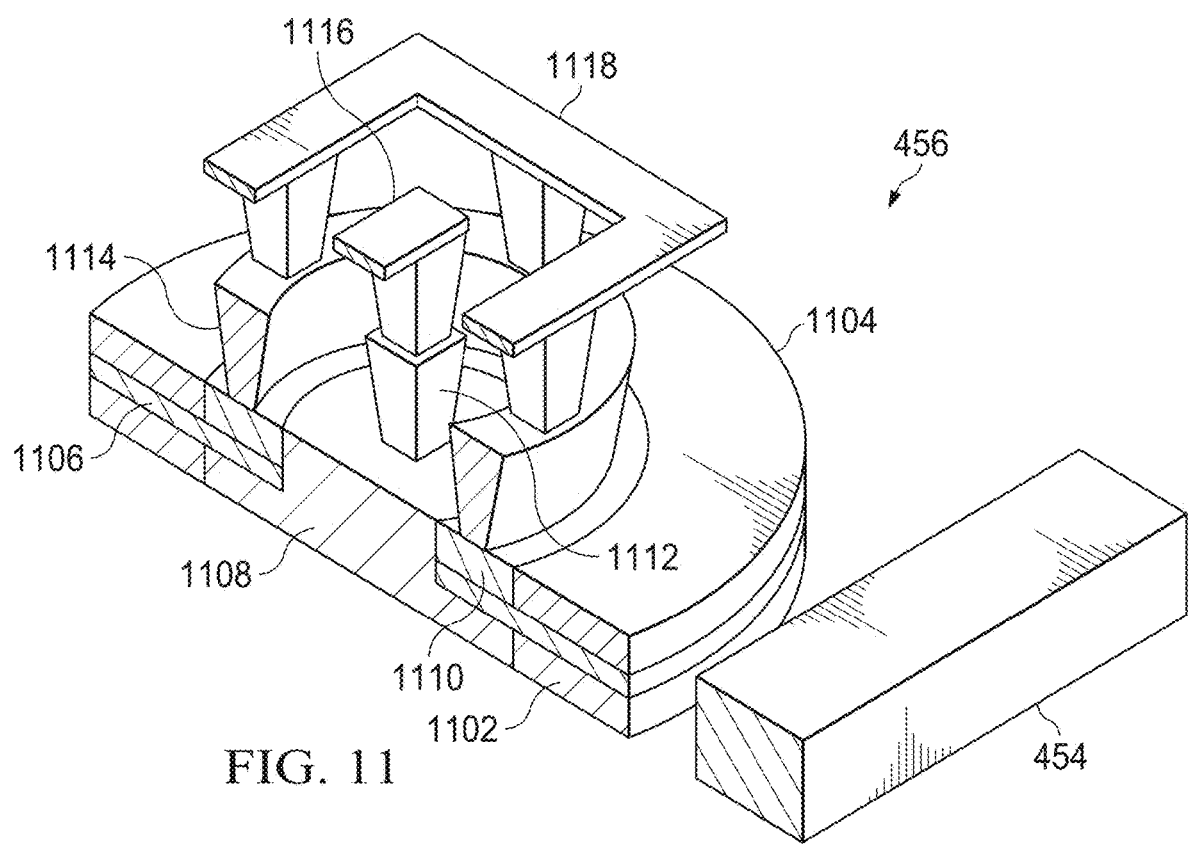

FIGS. 10 and 11 illustrate example phase modulators for use in a photonic integrated circuit according to this disclosure. In particular, FIGS. 10 and 11 illustrate example phase modulators 456 that may be used in the unit cells 404 of the optical phased array 402. Note, however, that the same or similar type of structure may also or alternatively be used as any of the other phase modulators 604, 616 discussed above.

As shown in FIG. 10, the phase modulator 456 here represents a thermal resonator that is implemented using a micro-ring resonator 1002 and a heater 1004 positioned above or otherwise near the micro-ring resonator 1002. The micro-ring resonator 1002 resonates based on an optical signal flowing through the associated signal pathway 454. Varying the temperature of the micro-ring resonator 1002 alters the resonance wavelength of the micro-ring resonator 1002, thereby changing the phase of the optical signal flowing through the signal pathway 454. Voltages can be applied to two electrical contacts 1006 of the heater 1004 in order to create the desired temperature change and therefore implement the desired phase shift of the optical signal flowing through the signal pathway 454. Different voltages applied to the heater 1004 can cause different phase shifts to occur in the phase modulator 456.

The micro-ring resonator 1002 may be formed from any suitable material(s), such as silicon, and in any suitable manner. The heater 1004 may be formed from any suitable material(s), such as one or more metals, and in any suitable manner. The micro-ring resonator 1002 may be separated from the heater 1004 by any suitable material(s), such as silicon dioxide. The micro-ring resonator 1002 and heater 1004 may each have any suitable size, shape, and dimensions. In some embodiments, the micro-ring resonator 1002 is annular and has a diameter of about 6 µm, and the heater 1004 is crescent-shaped and has a diameter of about 6 µm. However, other shapes and sizes may be used here. A gap 1008 between the micro-ring resonator 1002 and the signal pathway 454 may have any suitable value, such as about 150 nm to about 210 nm (±10 nm). In some cases, design parameters like the thickness of the micro-ring resonator 1002 or the size of the gap 1008 can be altered in order to provide desired functionality for the phase modulator 456.

As shown in FIG. 11, the phase modulator 456 here represents a PN junction micro-ring modulator that is implemented using various regions of semiconductor material, such as doped and undoped silicon. In this example, the phase modulator 456 is shown in cross-section for explanation. Here, the phase modulator 456 includes a first annular semiconductor region 1102 separated from a second annular semiconductor region 1104. The annular semiconductor regions 1102 and 1104 can represent different types of semiconductor material, such as when the annular semiconductor region 1102 represents an N-type semiconductor material and the annular semiconductor region 1104 represents a P-type semiconductor material. A semiconductor region 1106 (such as undoped silicon) can separate the regions 1102-1104. A doped semiconductor region 1108 is positioned within the annular regions 1102-1104, and a doped semiconductor region 1110 is positioned around an upper portion of the doped semiconductor region 1108. The doped semiconductor regions 1108 and 1110 can represent different regions of semiconductor material with different dopants, such as when the doped semiconductor region 1108 is doped with an N+ dopant and the doped semiconductor region 1110 is doped with a P+ dopant. An electrical contact 1112 can be used to form an electrical connection with the doped semiconductor region 1108, and an electrical contact 1114 can be used to form an electrical connection with the doped semiconductor region 1110. An electrical connection 1116 can be used to provide a voltage to the electrical contact 1112, and an electrical connection 1118 can be used to provide a voltage to the electrical contact 1114.

Here, the various semiconductor regions 1102-1110 form a PN junction micro-ring modulator, and the electrical contacts 1112, 1114 and electrical connections 1116, 1118 allow voltages to be applied that alter the charge carrier density of the PN junction micro-ring modulator. This alters the phase of an optical signal flowing through the associated signal pathway 454. Voltages applied to the electrical connections 1116, 1118 can provide the desired voltage difference and therefore implement the desired phase shift of the optical signal flowing through the signal pathway 454. Different voltages applied to the electrical connections 1116, 1118 can cause different phase shifts to occur in the phase modulator 456.

Although FIGS. 10 and 11 illustrate examples of phase modulators for use in a photonic integrated circuit, various changes may be made to FIGS. 10 and 11. For example, the actual structure of a thermal resonator or PN junction micro-ring modulator can vary as needed or desired. Also, any other suitable structure may be used to phase-modulate an optical signal in each photonic integrated circuit 302, 302a-302c described above.

The following describes example embodiments of this disclosure that implement or relate to photonic integrated circuit-based optical communication optimized for receive aperture amplitude and phase modulations. However, other embodiments may be used in accordance with the teachings of this disclosure.

In a first embodiment, an apparatus includes a photonic integrated circuit having an optical phased array, where the optical phased array includes multiple unit cells. Each unit cell includes (i) an antenna element configured to receive optical signals and (ii) a modulator configured to phase-shift the optical signals received by the antenna element. Multiple subgroups of the unit cells in the optical phased array are configured to generate multiple combined optical signals based on the received optical signals. The apparatus also includes at least one of: (i) amplitude adjusters configured to modify amplitudes of the combined optical signals in order to compensate for amplitude modulations across a receive aperture of the optical phased array and (ii) phase modulators configured to modify phases of the combined optical signals in order to compensate for phase modulations across the receive aperture of the optical phased array.

In a second embodiment, a method includes receiving optical signals at a photonic integrated circuit having an optical phased array, where the optical phased array includes multiple unit cells. Each unit cell includes (i) an antenna element configured to receive the optical signals and (ii) a modulator configured to phase-shift the optical signals received by the antenna element. Multiple subgroups of the unit cells in the optical phased array generate multiple combined optical signals based on the received optical signals. The method also includes at least one of: (i) modifying amplitudes of the combined optical signals using amplitude adjusters in order to compensate for amplitude modulations across a receive aperture of the optical phased array and (ii) modifying phases of the combined optical signals using phase modulators in order to compensate for phase modulations across the receive aperture of the optical phased array.

In a third embodiment, an apparatus includes a photonic integrated circuit having an optical phased array, where the optical phased array includes multiple unit cells. Each unit cell includes (i) means for receiving optical signals and (ii) means for shifting a phase of the optical signals. Multiple subgroups of the unit cells in the optical phased array are configured to generate multiple combined optical signals based on the received optical signals. The apparatus also includes at least one of: (i) means for modifying amplitudes of the combined optical signals in order to compensate for amplitude modulations across a receive aperture of the optical phased array and (ii) means for modifying phases of the combined optical signals in order to compensate for phase modulations across the receive aperture of the optical phased array.

Any single one or any suitable combination of the following features may be used with the first or third embodiment. The apparatus may include the amplitude adjusters, and the amplitude adjusters may be configured to substantially equalize the amplitudes of the combined optical signals. The apparatus may further include additional phase modulators configured to modify phases of amplified optical signals generated by the amplitude adjusters in order to compensate for phase shifts created by the amplitude adjusters. The optical phased array may be further configured to transmit outgoing optical signals, the apparatus may further include multiple circulators, and each circulator may be configured to (i) receive a portion of the outgoing optical signals and provide the portion of the outgoing optical signals to a specified one of the subgroups of the unit cells and (ii) receive the combined optical signals from the specified one of the subgroups of the unit cells and provide the combined optical signals from the specified one of the subgroups of the unit cells to a specified one of the amplitude adjusters. The apparatus may further include at least one receive detector configured to generate electrical signals based on amplified optical signals generated by the amplitude adjusters and multiple equalization detectors configured to measure amplitudes of samples of the amplified optical signals, and the apparatus may be configured to provide feedback to a transmitting device that transmits the received optical signals based on outputs of the equalization detectors. The amplitude adjusters may include one of: optical amplifiers or variable optical attenuators. The apparatus may include the phase modulators, and the phase modulators may be configured to substantially equalize the phases of the combined optical signals. The apparatus may further include multiple feedback detectors configured to measure the phases of the combined optical signals and multiple optical couplers configured to provide samples of the combined optical signals to the feedback detectors. The apparatus may further include multiple optical detectors configured to measure amplitudes of additional samples of the combined optical signals, and the apparatus may be configured to provide feedback to a transmitting device that transmits the received optical signals based on outputs of the optical detectors. The apparatus may include the amplitude adjusters and the phase modulators.

Any single one or any suitable combination of the following features may be used with the second embodiment. The method may include modifying the amplitudes of the combined optical signals using the amplitude adjusters, and the amplitude adjusters may substantially equalize the amplitudes of the combined optical signals. The method may further include modifying phases of amplified optical signals generated by the amplitude adjusters using additional phase modulators in order to compensate for phase shifts created by the amplitude adjusters. The method may further include transmitting outgoing optical signals using the optical phased array and using multiple circulators to provide the outgoing optical signals to the optical phased array, and each circulator may be configured to (i) receive a portion of the outgoing optical signals and provide the portion of the outgoing optical signals to a specified one of the subgroups of the unit cells and (ii) receive the combined optical signals from the specified one of the subgroups of the unit cells and provide the combined optical signals from the specified one of the subgroups of the unit cells to a specified one of the amplitude adjusters. The method may further include generating electrical signals based on amplified optical signals generated by the amplitude adjusters using at least one receive detector, measuring amplitudes of samples of the amplified optical signals using multiple equalization detectors, and providing feedback to a transmitting device that transmits the received optical signals based on outputs of the equalization detectors. The amplitude adjusters may include one of: optical amplifiers or variable optical attenuators. The method may include modifying the phases of the combined optical signals using the phase modulators, and the phase modulators may substantially equalize the phases of the combined optical signals. The method may further include measuring the phases of the combined optical signals using multiple feedback detectors and providing samples of the combined optical signals to the feedback detectors using multiple optical couplers. The method may further include measuring amplitudes of additional samples of the combined optical signals using multiple optical detectors and providing feedback to a transmitting device that transmits the received optical signals based on outputs of the optical detectors. The method may include modifying the amplitudes of the combined optical signals using the amplitude adjusters and modifying the phases of the combined optical signals using the phase modulators.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a photonic integrated circuit comprising an optical phased array, the optical phased array comprising multiple unit cells, each unit cell comprising (i) an antenna element configured to receive optical signals and (ii) a modulator configured to phase-shift the optical signals received by the antenna element, wherein multiple subgroups of the unit cells in the optical phased array are configured to generate multiple combined optical signals based on the received optical signals; and
at least one of: (i) amplitude adjusters configured to modify amplitudes of the combined optical signals in order to compensate for amplitude modulations across a receive aperture of the optical phased array and (ii) phase modulators configured to modify phases of the combined optical signals in order to compensate for phase modulations across the receive aperture of the optical phased array.

2. The apparatus of claim 1, wherein:
the apparatus comprises the amplitude adjusters; and
the amplitude adjusters are configured to substantially equalize the amplitudes of the combined optical signals.

3. The apparatus of claim 2, further comprising:
additional phase modulators configured to modify phases of amplified optical signals generated by the amplitude adjusters in order to compensate for phase shifts created by the amplitude adjusters.

4. The apparatus of claim 2, wherein:
the optical phased array is further configured to transmit outgoing optical signals; and
the apparatus further comprises multiple circulators, each circulator configured to:
receive a portion of the outgoing optical signals and provide the portion of the outgoing optical signals to a specified one of the subgroups of the unit cells; and
receive the combined optical signals from the specified one of the subgroups of the unit cells and provide the combined optical signals from the specified one of the subgroups of the unit cells to a specified one of the amplitude adjusters.

5. The apparatus of claim 2, further comprising:
at least one receive detector configured to generate electrical signals based on amplified optical signals generated by the amplitude adjusters; and
multiple equalization detectors configured to measure amplitudes of samples of the amplified optical signals;
wherein the apparatus is configured to provide feedback to a transmitting device that transmits the received optical signals based on outputs of the equalization detectors.

6. The apparatus of claim 2, wherein the amplitude adjusters comprise one of: optical amplifiers or variable optical attenuators.

7. The apparatus of claim 1, wherein:
the apparatus comprises the phase modulators; and
the phase modulators are configured to substantially equalize the phases of the combined optical signals.

8. The apparatus of claim 7, further comprising:
multiple feedback detectors configured to measure the phases of the combined optical signals; and
multiple optical couplers configured to provide samples of the combined optical signals to the feedback detectors.

9. The apparatus of claim 8, further comprising:
multiple optical detectors configured to measure amplitudes of additional samples of the combined optical signals;
wherein the apparatus is configured to provide feedback to a transmitting device that transmits the received optical signals based on outputs of the optical detectors.

10. The apparatus of claim 1, wherein the apparatus comprises the amplitude adjusters and the phase modulators.

11. A method comprising:
receiving optical signals at a photonic integrated circuit comprising an optical phased array, the optical phased array comprising multiple unit cells, each unit cell comprising (i) an antenna element configured to receive the optical signals and (ii) a modulator configured to phase-shift the optical signals received by the antenna element, wherein multiple subgroups of the unit cells in the optical phased array generate multiple combined optical signals based on the received optical signals; and
at least one of: (i) modifying amplitudes of the combined optical signals using amplitude adjusters in order to compensate for amplitude modulations across a receive aperture of the optical phased array and (ii) modifying phases of the combined optical signals using phase modulators in order to compensate for phase modulations across the receive aperture of the optical phased array.

12. The method of claim 11, wherein:
the method comprises modifying the amplitudes of the combined optical signals using the amplitude adjusters; and
the amplitude adjusters substantially equalize the amplitudes of the combined optical signals.

13. The method of claim 12, further comprising:
modifying phases of amplified optical signals generated by the amplitude adjusters using additional phase modulators in order to compensate for phase shifts created by the amplitude adjusters.

14. The method of claim 12, further comprising:
transmitting outgoing optical signals using the optical phased array; and
using multiple circulators to provide the outgoing optical signals to the optical phased array, each circulator configured to:
receive a portion of the outgoing optical signals and provide the portion of the outgoing optical signals to a specified one of the subgroups of the unit cells; and
receive the combined optical signals from the specified one of the subgroups of the unit cells and provide the combined optical signals from the specified one of the subgroups of the unit cells to a specified one of the amplitude adjusters.

15. The method of claim 12, further comprising:
generating electrical signals based on amplified optical signals generated by the amplitude adjusters using at least one receive detector;
measuring amplitudes of samples of the amplified optical signals using multiple equalization detectors; and
providing feedback to a transmitting device that transmits the received optical signals based on outputs of the equalization detectors.

16. The method of claim 12, wherein the amplitude adjusters comprise one of: optical amplifiers or variable optical attenuators.

17. The method of claim 11, wherein:
the method comprises modifying the phases of the combined optical signals using the phase modulators; and
the phase modulators substantially equalize the phases of the combined optical signals.

18. The method of claim 17, further comprising:
measuring the phases of the combined optical signals using multiple feedback detectors; and
providing samples of the combined optical signals to the feedback detectors using multiple optical couplers.

19. The method of claim 18, further comprising:
measuring amplitudes of additional samples of the combined optical signals using multiple optical detectors; and
providing feedback to a transmitting device that transmits the received optical signals based on outputs of the optical detectors.

20. An apparatus comprising:
a photonic integrated circuit comprising an optical phased array, the optical phased array comprising multiple unit cells, each unit cell comprising (i) means for receiving optical signals and (ii) means for shifting a phase of the optical signals, wherein multiple subgroups of the unit cells in the optical phased array are configured to generate multiple combined optical signals based on the received optical signals; and
at least one of: (i) means for modifying amplitudes of the combined optical signals in order to compensate for amplitude modulations across a receive aperture of the optical phased array and (ii) means for modifying phases of the combined optical signals in order to compensate for phase modulations across the receive aperture of the optical phased array.

* * * * *